United States Patent
Borlick et al.

(10) Patent No.: US 7,389,503 B2
(45) Date of Patent: Jun. 17, 2008

(54) APPARATUS AND METHOD TO UPDATE CODE IN AN INFORMATION STORAGE AND RETRIEVAL SYSTEM WHILE THAT SYSTEM REMAINS IN NORMAL OPERATION

(75) Inventors: Matthew G. Borlick, Tucson, AZ (US); Steven D. Johnson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 10/826,229

(22) Filed: Apr. 16, 2004

(65) Prior Publication Data

US 2005/0234962 A1 Oct. 20, 2005

(51) Int. Cl.
*G06F 9/44* (2006.01)

(52) U.S. Cl. ............... 717/168; 717/169; 717/170; 717/171; 717/172

(58) Field of Classification Search ............. 717/168, 717/169, 170, 171, 172; 711/114, 150, 162
See application file for complete search history.

(56) References Cited

U.S. PATENT DOCUMENTS

| | | | |
|---|---|---|---|
| 5,487,160 A * | 1/1996 | Bemis | 711/114 |
| 5,815,708 A | 9/1998 | Kessler et al. | |
| 5,822,607 A | 10/1998 | Henry et al. | |
| 6,115,550 A | 9/2000 | Hunter et al. | |
| 6,219,751 B1 * | 4/2001 | Hodges | 711/114 |
| 6,272,677 B1 * | 8/2001 | Lam et al. | 717/170 |
| 6,370,655 B1 | 4/2002 | Lin | |
| 6,405,316 B1 | 6/2002 | Krishnan et al. | |
| 6,539,495 B1 | 3/2003 | Elko et al. | |
| 6,772,364 B1 * | 8/2004 | Pinter et al. | 714/5 |
| 6,915,513 B2 * | 7/2005 | Duesterwald et al. | 717/168 |
| 7,171,606 B2 * | 1/2007 | Blackburn et al. | 717/173 |
| 7,174,438 B2 * | 2/2007 | Homma et al. | 711/161 |
| 2002/0073245 A1 | 6/2002 | Hallford | |
| 2002/0078437 A1 | 6/2002 | Grassman et al. | |
| 2003/0014561 A1 | 1/2003 | Cooper | |
| 2003/0033520 A1 | 2/2003 | Peiffer et al. | |
| 2003/0051070 A1 | 3/2003 | Shappir et al. | |
| 2003/0204833 A1 * | 10/2003 | Pokhariyal | 717/106 |
| 2004/0107416 A1 * | 6/2004 | Buban et al. | 717/170 |

OTHER PUBLICATIONS

Stodolsky, et al. "Parity Logging: Overcoming the Small Write Problem in Redundant Disk Arrays", 1993, IEEE, p. 64-75.*
Stodolsky, et al. "Parity-Logging Disk Arrays", 1994, ACM, p. 206-235.*

* cited by examiner

*Primary Examiner*—Wei Zhen
*Assistant Examiner*—Qamrun Nahar
(74) *Attorney, Agent, or Firm*—Chandler & Udall, LLP; Dale F. Regelman

(57) ABSTRACT

A method to update code in an information storage and retrieval system comprising one or more processors, and existing code, where that existing code includes a Concurrent Code Load having (N) phases, where that Concurrent Code Load invokes an as yet unwritten Temporal Coupling File. The method provides a code update image comprising that Temporal Coupling File. If the (i)th phase of the Concurrent Code Load invokes the Temporal Coupling File, then the method reads instructions for that (i)th phase of the Concurrent Code Load from the Temporal Coupling File, and executes those instructions. The method completes each phase of the Concurrent Code Load, and then operates the system using the code update.

10 Claims, 2 Drawing Sheets

APPARATUS AND METHOD TO UPDATE CODE IN AN INFORMATION STORAGE AND RETRIEVAL SYSTEM WHILE THAT SYSTEM REMAINS IN NORMAL OPERATION

FIELD OF THE INVENTION

The invention relates to an apparatus and method to update the code in an information storage and retrieval system while that system remains in normal operation.

Information storage and retrieval systems are used to store information provided by one or more host computer systems. Such information storage and retrieval systems receive requests to write information to one or more information storage devices, and requests to read information from those one or more information storage devices. The system is continuously moving information to and from storage devices.

Operation of the system is controlled by one or more processors using existing code. It may be desirable, or necessary, to update that code. To achieve maximal efficiency, the information storage and retrieval system should remain in normal operation while loading such code updates.

In order to properly load the code update, certain operational prerequisites may have to met, and/or certain system parameters must exist. These operational prerequisites and/or system parameters may have been unknown or unidentified when the existing code was created.

What is needed is a method to invoke portions of a code update by the system's existing code during Concurrent Code Load, where that existing code was written and installed before the code update is generated.

SUMMARY OF THE INVENTION

Applicants' invention includes an apparatus and method to update code in an information storage and retrieval system while that system remains in normal operation. Applicants' method provides an information storage and retrieval system comprising one or more processors, and existing code, where those one or more processors use that existing code to operate the information storage and retrieval system, and where Applicants' existing code includes instructions, i.e. executable sequences, to perform a Concurrent Code Load having (N) phases.

The method generates a code update image comprising a Temporal Coupling File, where the Concurrent Code Load includes instructions to read that Temporal Coupling File. The method provides that code update image to Applicants' information storage and retrieval system. The method then executes the (i)th phase of said Concurrent Code Load, where (i) is greater than or equal to 1 and less than or equal to (N), and where (i) is initially set to 1, and determines if the (i)th phase of said Concurrent Code Load invokes the Temporal Coupling File.

If the (i)th phase of said Concurrent Code Load process invokes the Temporal Coupling File, then the method reads instructions for that (i)th phase of the Concurrent Code Load from the Temporal Coupling File, and executes those instructions. Thereafter, the method completes the (i)th phase of the Concurrent Code Load, and ascertains if (i) equals (N). If (i) equals (N), the method operates the information storage and retrieval system using the code update.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in a data storage and retrieval system comprising two or more clusters, where each of those clusters includes one or more processors, one or more data caches, and one or more non-volatile storage devices. The following description of Applicant's method to update code in an information storage and retrieval system is not meant, however, to limit Applicant's invention to data processing systems in general, or to data processing system which include a plurality of clusters, as the invention herein can be applied to updating device microcode in general.

Figure 1:
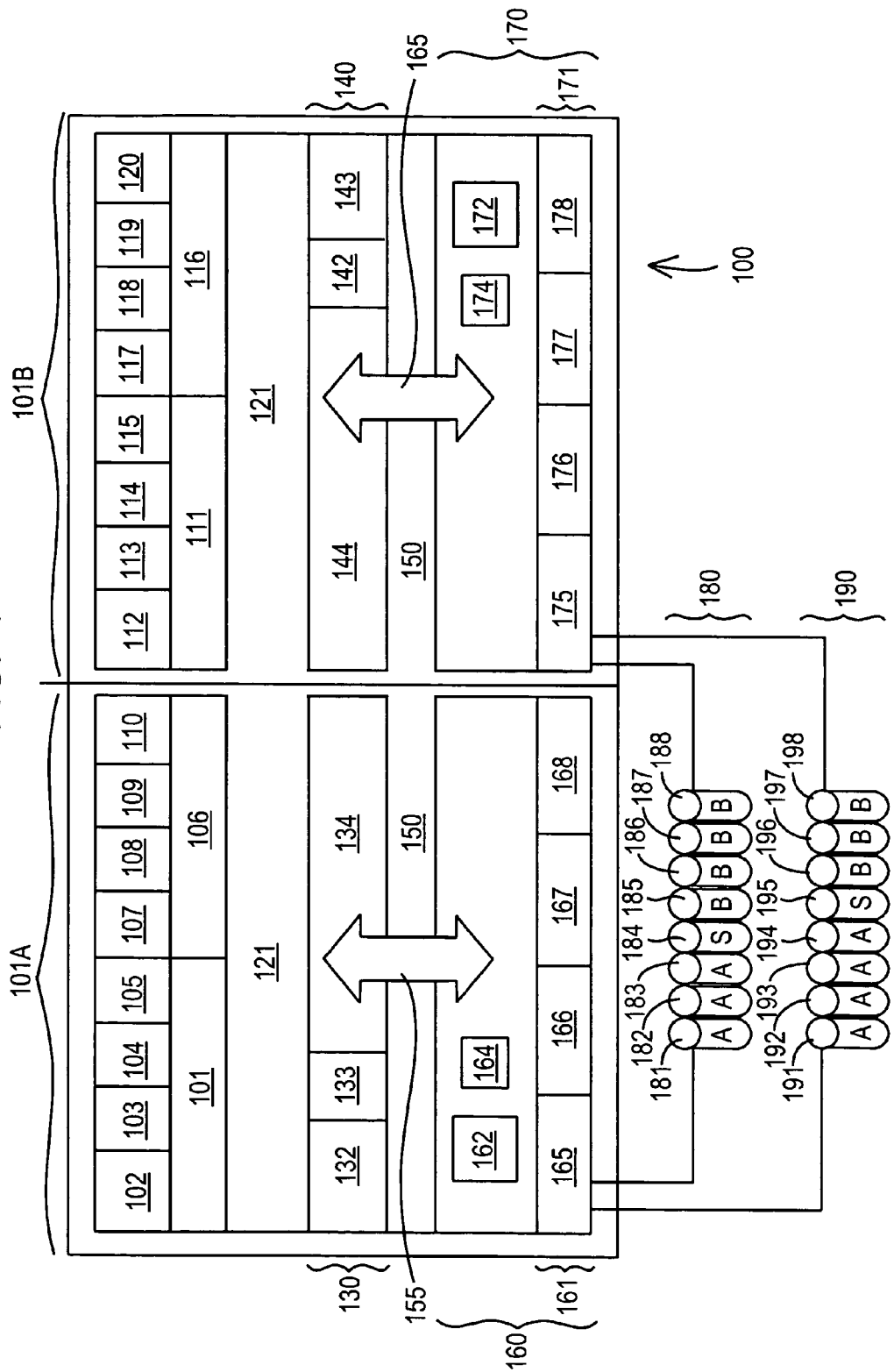
FIG. 1 is a block diagram showing the components of Applicants' data storage and retrieval system.

In the illustrated embodiment of FIG. 1, Applicants' information storage and retrieval system 100 includes a first cluster 101A and a second cluster 101B. Each cluster includes a processor portion 130/140 and an input/output portion 160/170, respectively. Internal PCI buses in each cluster are connected via a Remote I/O bridge 155/165 between the processor portions 130/140 and device I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect bus 121 such that each cluster can handle I/O from any host adapter.

Processor portion 130 includes processor 132 and cache 134. In certain embodiments, processor portion 130 further include memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further include memory 143. In certain embodiments, memory device 143 comprises random access memory. In certain embodiments, memory device 143 comprises non-volatile memory.

I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two arrays, namely array "A" and array "B". The illustrated embodiment of FIG. 1 shows two disk arrays. In other embodiments, Applicants' information storage and retrieval system includes more than two hard disk arrays. Each array of drives appears to a host computer as one or more logical drives.

In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and reliability that exceeds that of a single large drive.

In the illustrated embodiment of FIG. 1, disk array "A" includes disk drives 181, 182, 183, 191, 192, 193, and 194. Disk array "B" includes disk drives 185, 186, 187, 188, 196, 197, and 198.

As described above, Applicants' information storage and retrieval system, such as system 100 (FIG. 1), includes one or more processors and one or more memory devices. A sequence of executable microcode, often known as firmware, is stored within the memory. During operation of Applicants' information storage and retrieval system, this sequence of executable microcode is loaded from the memory to one or more processors for execution. References herein to "code" and/or "microcode" herein refer to such executable sequences.

As those skilled in the art will appreciate, it often becomes desirable, or necessary, to update the system's code. Applicants' existing code includes a Concurrent Code Load element, where that Concurrent Code Load is used to update the system's existing code while Applicants' system remains in normal operation. By "remains in normal operation," Applicants mean the system continues to read and/or write information to/from one or more information storage devices, and/or continues to execute other host computer commands.

Applicants' invention includes a method to temporally couple elements of the system's existing code with the updated code during that Concurrent Code Load. Applicants' existing code, written at a first time and installed on Applicants' information storage and retrieval system at a second time subsequent to the first time, can invoke elements of a code update written at a third time, where that third time is subsequent to the second time. In certain embodiments, Applicants' existing code can invoke a Temporal Coupling File, where that Temporal Coupling File comprises a portion of Applicants' code update. By "invoking a Temporal Coupling File," Applicants' mean, for example, the Concurrent Code Load includes a function call to the Temporal Coupling File, and/or the Concurrent Code Load includes a script which causes a system processor to read instructions from the Temporal Coupling File. Thus, the Applicants' existing code can invoke elements of a future code update, where that future code update was not written when the existing code was created and installed.

Figure 2:
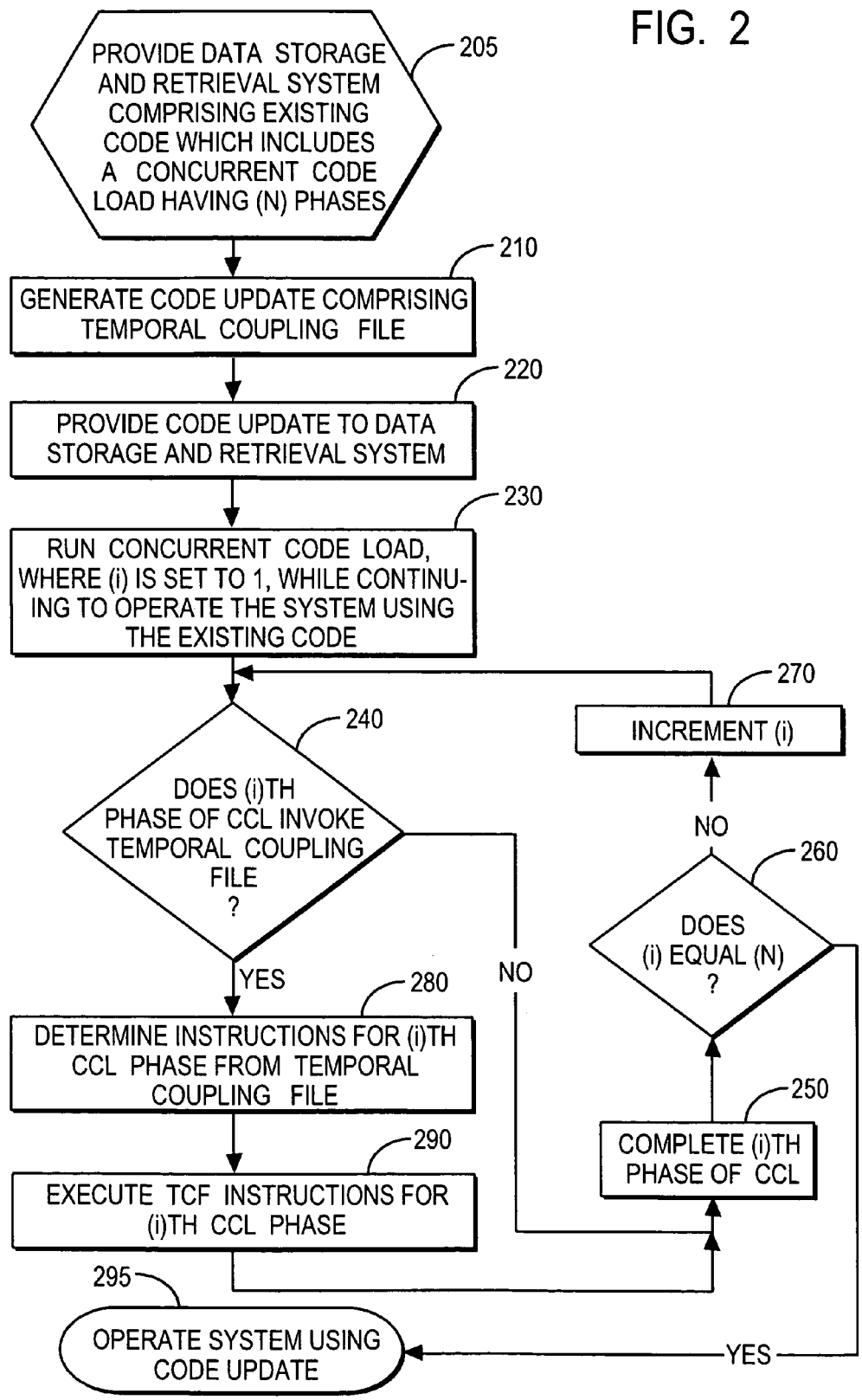
FIG. 2 is flow chart summarizing the steps of Applicants' method.

FIG. 2 summarizes the steps of Applicants' method. Referring now to FIG. 2, in step 202 Applicants' method provides a data storage and retrieval system comprising existing code to operate that system, where that existing code includes instructions which cause the local processor to implement a Concurrent Code Load.

Using Applicants' Concurrent Code Load, Applicants' data storage and retrieval system, such as for example system 100 (FIG. 1), receives a code update and implements that code update while remaining in normal operation using the existing code. After the Concurrent Code Load is completed, the processor(s) operates Applicants' information storage and retrieval system using the newly-installed code update.

In certain embodiments, that Concurrent Code Load includes (N) phases. In certain embodiments, (N) is 10. In other embodiments, (N) is less than 10. In yet other embodiments, (N) is greater than 10.

In step 210, Applicants' method generates a code update image for Applicants' data storage and retrieval system, where that code update image includes a Temporal Coupling File. As those skilled in the art will appreciate, code updates may be generated to increase the capabilities of Applicants' system, or to increase the efficiency of Applicants' system, or to decrease the costs to operate Applicants' system, or to fix a "bug" in the existing code, or some combination thereof.

In certain embodiments, the code update image of step 210 comprises a single operational code image. For example, the code update image may completely replace the existing code inside the information storage and retrieval system. In other embodiments, the code update image of step 210 comprises multiple code images. Applicants' information storage and retrieval system comprises multiple operational code areas where each area provides a particular service or function. The code update image may replace one or more of these operational code areas. In yet other embodiments, the code update image comprises a partial code image. For example, the code update image may provide a patch or modification to an operational code area within the information storage and retrieval system.

In step 220, Applicants' method provides the code update image of step 210 to Applicants' information storage and retrieval system. The code update image may be provided through a host interface, a subsystem interface, or some other interface associated with the system. The interface may comprise an RS-232 interface, USB (Universal Serial Bus), Firewire, Ethernet, SCSI (Small Computer Systems Interface), Fibre Channel or any other communications interface known to those of skill in the art. In addition, the interface may comprise a wireless interface such as infrared, optical, inductive, RF (Radio Frequency) or any other wireless interface known to those of skill in the art.

In certain embodiments, the code update image of step 210 is written to an information storage medium, and in step 220 that information storage medium is mounted in a device disposed in Applicants' information storage and retrieval system which is capable of reading that information storage medium. In certain embodiments, the information storage medium comprises a magnetic medium, such as for example a floppy disk, a magnetic tape, and the like. In certain embodiments, the information storage medium comprises an optical medium, such as for example a CD, a DVD, and the like. In certain embodiments, the information storage medium comprises an electronic medium, such as for example a PROM, EPROM, EEPROM, Flash PROM, compactflash, smartmedia, and the like.

In step 230, Applicants' method uses the existing code to install the code update provided in step 220. In certain embodiments, the Concurrent Code Load code portion of the existing code is invoked in step 230 to install the code update image while the information storage and retrieval systems remains in normal operation.

In certain embodiments, the Concurrent Code Load portion of the existing code comprises (N) phases, and step 230 includes executing the first phase of the Concurrent Code Load, i.e. setting (i) equal to 1 and running the (i)th phase of the Concurrent Code Load portion of the existing code. In certain embodiments, step 230 is performed by a processor, such as processor 132 (FIG. 1), disposed in Applicants' information storage and retrieval system, such as for example system 100 (FIG. 1).

Applicants' method transitions from step 230 to step 240 wherein the method determines if the (i)th phase of the Concurrent Code Load invokes the Temporal Coupling File disposed in the code update. In certain embodiments, step 240 is performed by a processor, such as processor 132, disposed in Applicants' information storage and retrieval system, such as for example system 100.

In certain embodiments, each phase of the Concurrent Code Load includes examining the Temporal Coupling File to determine if the Temporal Coupling File includes instructions for that phase. In other embodiments, Applicants' Concurrent Code Load includes (N) indicators, where each of those (N) indicators can have a first value or a second value. Each of the (N) indicators represents a different one of the (N) phases of the Concurrent Code Load. In certain embodiments, the (N) indicators comprise a bit map which includes (N) bits, where each of those (N) bits has either a first value, i.e. "0", or a second value, i.e. "1".

In the indicator embodiments, step 240 includes checking the (i)th indicator. If the (i)th indicator is set to a first value, then Applicants' method determines in step 240 that the (i)th phase of the Concurrent Code Load does not invoke the Temporal Coupling File, and the method transitions from step 240 to step 250. Alternatively, if the (i)th indicator is set to a second value, then Applicant's method determines in step 240 that the (i)th phase of the Concurrent Code Load does invoke the Temporal Coupling File, and the method transitions from step 240 to step 280.

If Applicants' method determines in step 240 that the (i)th phase of the Concurrent Code Load does not invoke the Temporal Coupling File, then the method transitions from step 240 to step 250 wherein the local processor completes the (i)th phase of the Concurrent Code Load. Applicants' method transitions from step 250 to step 260 wherein the method determines if the Concurrent Code Load is complete, i.e. if (i) equals (N). If all phases of the Concurrent Code Load have not been completed, i.e. if (i) does not equal (N), then the method transitions from step 260 to step 270 wherein the method sets (i) equal to (i)+1. Applicants' method transitions from step 270 to step 240 and continues as described above.

If Applicants' method determines in step 240 that the (i)th phase of the Concurrent Code Load does invoke the Temporal Coupling File, then Applicants' method transitions from step 240 to step 280 wherein the method reads instructions from the Temporal Coupling File pertaining to execution of the (i)th phase of the Concurrent Code Load.

Applicants' method transitions from step 280 to step 290 wherein the local processor executes the instructions recited in the Temporal Coupling File for the (i)th phase of the Concurrent Code Load. Applicants' method transitions from step 290 to step 250 and continues as described above.

In certain embodiments, the (i)th phase of Applicants' Concurrent Code Load includes quiescing input/output ("I/O") to a first cluster in Applicants' information storage and retrieval system, such as for example cluster 101A (FIG. 1). When I/O to cluster 101A is quiesced, information stored in disk arrays 180 and 190 can be still read using a device adapter, such as device adapter 175 (FIG. 1) disposed in cluster 101B (FIG. 1). If the device adapters in cluster 101B, however, are not in operation, then quiescing I/O to cluster 101A renders the information stored in arrays 180 and/or 190 unavailable.

In order to avoid the-above described scenario wherein quiescing I/O to one cluster during the (i) phase of the Concurrent Code Load renders the information disposed in the entire system unavailable, in certain embodiments Applicants' Temporal Coupling File instructs the local processor to determine, during the (i) phase of the Concurrent Code Load, that one or more device adapters disposed in at least one other cluster are fully operational before quiescing I/O to the first cluster. In these embodiments, in step 240 Applicants' method examines the Temporal Coupling File and determines that the (i)th phase of the Concurrent Code Load invokes that Temporal Coupling File. In these embodiments, in step 280 a processor disposed in Applicants' system, such as for example processor 132, reads instructions from the Temporal Coupling File, where those instructions cause the processor to determine if one or more device adapters in another cluster, such as cluster 101B for example, are operational, prior to quiescing I/O to the first cluster. In this embodiment, step 270 further includes reading instructions which, if those one or more device adapters are operational, causes the processor to complete the (i)th phase of the Concurrent Code Load, i.e. to quiesce I/O to the first cluster, or if none of those device adapters are operational causes the processor to discontinue the Concurrent Code Load.

In this embodiment, in step 280 the processor determines if one or more device adapters in a different cluster are operational. If one or more device adapters in a different cluster are operational, then in step 290 the processor completes the (i)th phase of the Concurrent Code Load, i.e. quiesces I/O to the first cluster. If one or more device adapters in a different cluster are not operational, then step 280 includes generating an error message and discontinuing the Concurrent Code Load.

In certain embodiments of Applicants' method, in order to install the (m)th code update on Applicants' information storage and retrieval system the (m−1)th code update must first be installed. In these embodiments, during the (i)th phase of the Concurrent Code Load, and in step 240 of Applicants' method, a system processor examines the Temporal Coupling File and determines that the (i)th phase of the Concurrent Code Load invokes that Temporal Coupling File. In this embodiment, in step 280 the processor, such as for example processor 132, reads instructions from the Temporal Coupling File which cause that processor to determine if the (m−1)th code update has been installed, and if that (m−1)th update has been installed then to continue the Concurrent Code Load, or if that (m−1)th update has not been installed, then to generate an error message.

In step 290, that processor determines if the (m−1)th code update has been installed. If the processor determines in step 290 that Applicants' (m)th code update includes has been installed, then the method transitions from step 290 to step 250 wherein the local processor completes the (i)th phase of the Concurrent Code Load. Alternatively, if the local processor determines in step 290 that Applicants' (m)th code update includes has not been installed, then the method generates an error message and discontinues the Concurrent Code Load.

In certain embodiments, individual steps recited in FIG. 2 may be combined, eliminated, or reordered.

In certain embodiments, Applicants' invention includes instructions residing in memory 133 (FIG. 1), where those instructions are executed by processor 132 (FIG. 1) to performs steps 220, 230, 240, 250, 260, 270, 280, 290, and 295, recited in FIG. 2, wherein step 220 comprises receiving the code update image of step 210. In other embodiments, Applicants' invention includes instructions residing in any other computer program product, where those instructions are executed by a computer external to, or internal to, system 100, to perform steps 220, 230, 240, 250, 260, 270, 280, 290, and 295, recited in FIG. 2, wherein step 220 comprises receiving the code update image of step 210. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to update code in an information storage and retrieval system while that system remains in normal operation, comprising the steps of:
   providing an information storage and retrieval system comprising one or more processors;
   providing existing code, wherein said one or more processors use said existing code to operate said information storage and retrieval system, and wherein said existing code includes a Concurrent Code Load having (N) phases;
   generating a code update image comprising a Temporal Coupling File, wherein said Concurrent Code Load includes instructions to read said Temporal Coupling File;
   providing said code update image to said information storage and retrieval system;
   executing an (i)th phase of said Concurrent Code Load, wherein (i) is greater than or equal to 1 and less than or equal to (N), and wherein (i) is initially set to 1;
   determining if said (i)th phase of said Concurrent Code Load invokes said Temporal Coupling File;
   operative if said (i)th phase of said Concurrent Code Load invokes said Temporal Coupling File, reading instructions for said (i)th phase of said Concurrent Code Load from said Temporal Coupling File, and executing said instructions for said (i)th phase of said Concurrent Code Load;
   completing said (i)th phase of said Concurrent Code Load;
   ascertaining if (i) equals (N);
   operative if (i) equals (N), operating said information storage and retrieval system using said code update.

2. The method of claim 1, further comprising the steps of:
   operative if (i) does not equals (N):
   incrementing (i);
   repeating said executing, determining, completing, and ascertaining steps, and optionally said reading, executing, and incrementing steps.

3. The method of claim 1,:
   wherein said Concurrent Code Load includes (N) indicators, wherein each of said (N) indicators is assigned to a different one of said (N) phases, and wherein each of said (N) indicators can have a first value or a second value;
   wherein said determining step further includes examining an (i)th indicator;
   operative if said (i)th indicator is set to said first value, ascertaining that the (i)th phase of the Concurrent Code Load does not invoke the Temporal Coupling File; and
   operative if the (i)th indicator is set to said second value, ascertaining that the (i)th phase of the Concurrent Code Load does invoke the Temporal Coupling File.

4. The method of claim 1, wherein said Concurrent Code Load comprises 10 phases.

5. The method of claim 1, further comprising the steps of:
   creating said existing code at a first time;
   installing said existing code in said information storage and retrieval system at a second time;
   creating said Temporal Coupling File at a third time, wherein said third time is later than both said first time and said second time.

6. The method of claim 1, wherein said code update image comprises a (m)th code update, wherein said executing step includes determining if a (m−1)th code update has been installed.

7. The method of claim 6, further comprising the step of determining by said one or more processors if the (m−1)th code update has been installed;
   wherein said Temporal Coupling File includes instructions which cause said one or more processors to determine if the (m−1)th code update has been installed.

8. The method of claim 7, further comprising the step of generating an error message if the (m−1)th code update has not been installed.

9. The method of claim 1, wherein said information storage and retrieval system comprises one or more disk arrays and two or more clusters, wherein each of said two or more clusters includes, one of said one or more processors, one or more device adapters interconnected to said one or more disk arrays, and said existing code, and wherein said Concurrent Code Load includes quiescing I/O to a first one of said two or more clusters;
   said method further comprising the step of determining by a processor disposed in a first one of said two or more clusters if one or more device adapters disposed in a second one of said two or more clusters are operational before said processor disposed in said first one of said two or more clusters quiesces I/O to said first cluster;
   wherein said Temporal Coupling File includes instructions which cause said processor disposed in said first one of said two or more clusters to determine if one or more device adapters disposed in said second cluster are operational before quiescing I/O to said first cluster.

10. The method of claim 9, further comprising the step of generating an error message if one or more device adapters disposed in said second cluster are not operational.

* * * * *